Figure 1:
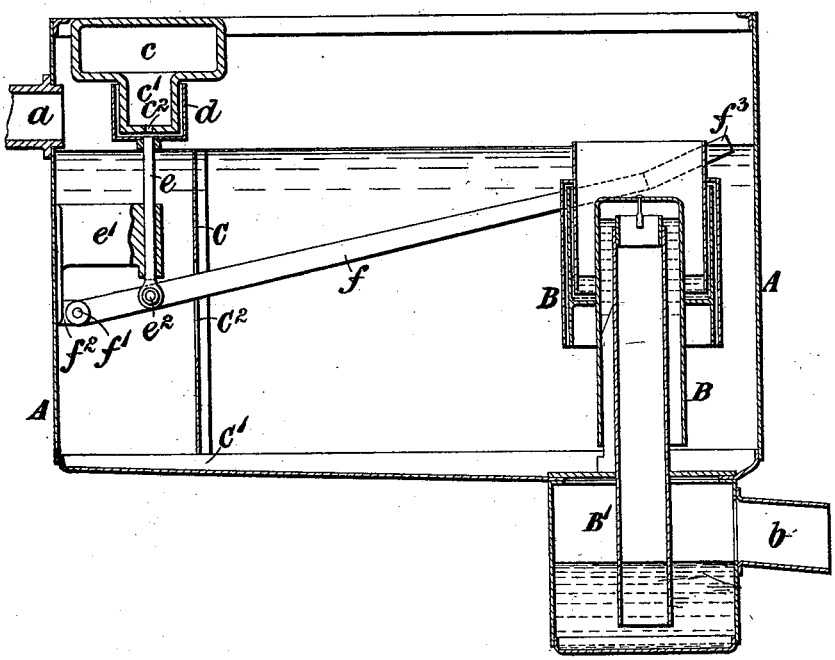

(No Model.) 8 Sheets—Sheet 1.
F. B. HILL.
TREATMENT OF SEWAGE AND VENTILATION OF DRAINS.

No. 555,006. Patented Feb. 18, 1896.

(No Model.) 8 Sheets—Sheet 2.
F. B. HILL.
TREATMENT OF SEWAGE AND VENTILATION OF DRAINS.

No. 555,006. Patented Feb. 18, 1896.

Witnesses:
J. A. Rutherford.
H. A. Shepherd.

Inventor:
Frederick B. Hill.
By James L. Norris.
Attorney.

(No Model.) 8 Sheets—Sheet 3.
F. B. HILL.
TREATMENT OF SEWAGE AND VENTILATION OF DRAINS.
No. 555,006. Patented Feb. 18, 1896.
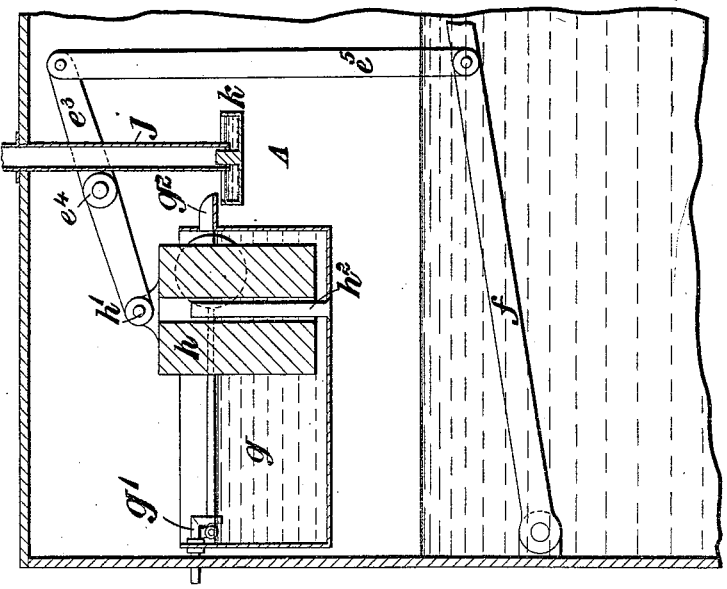
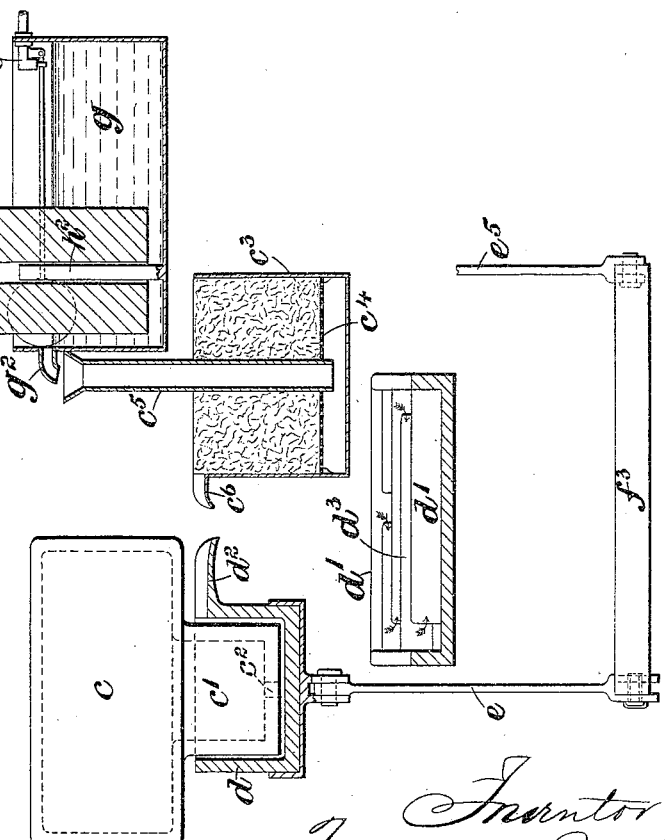

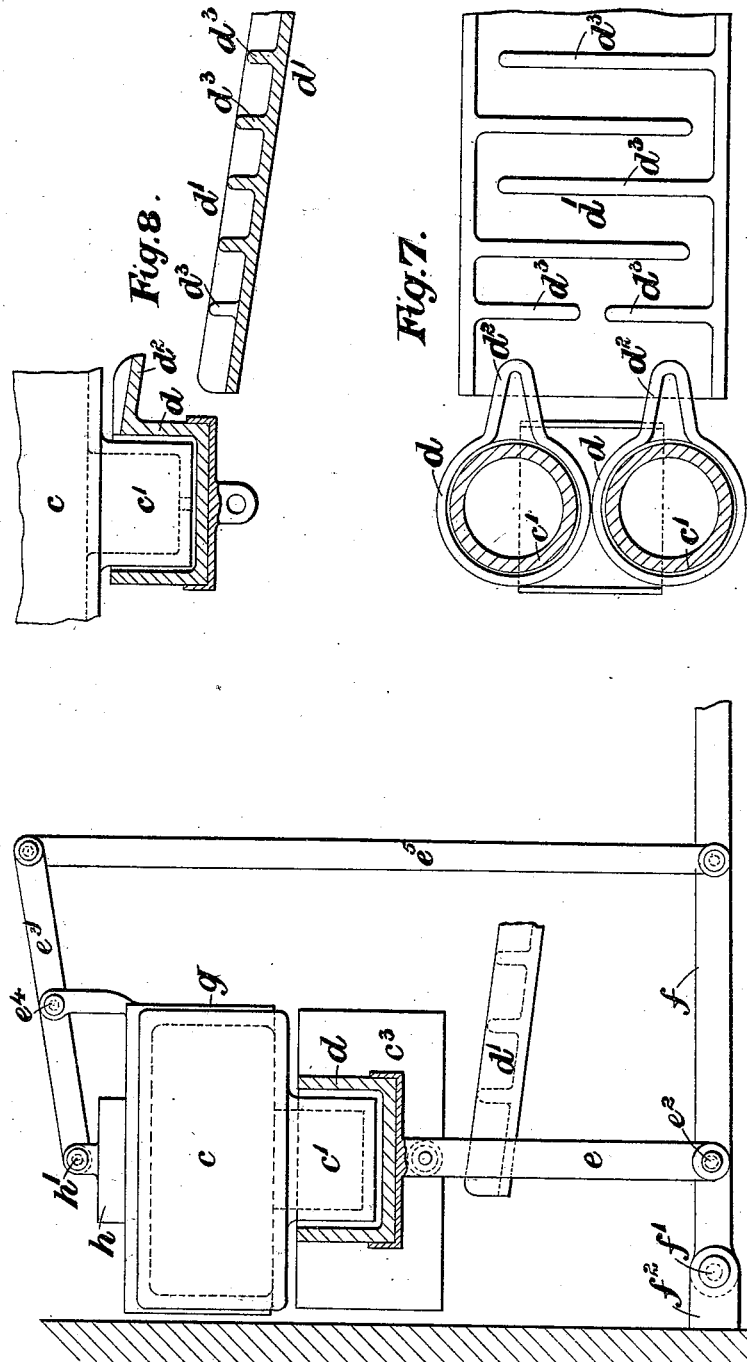

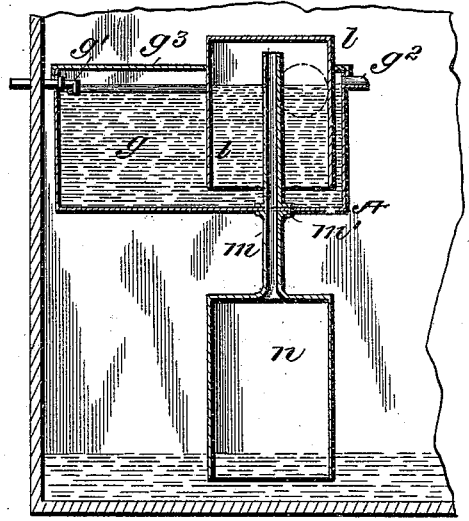

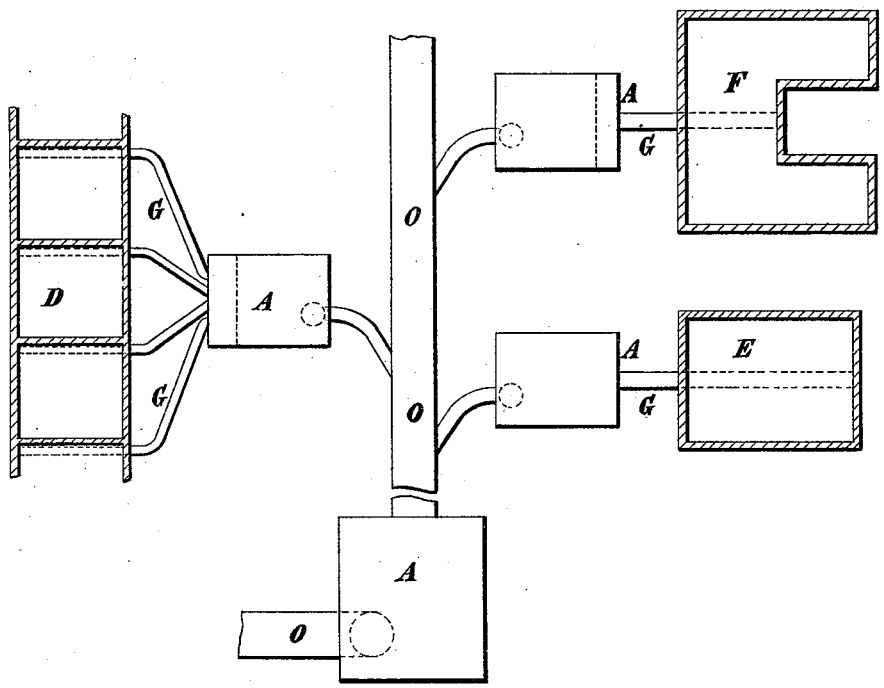

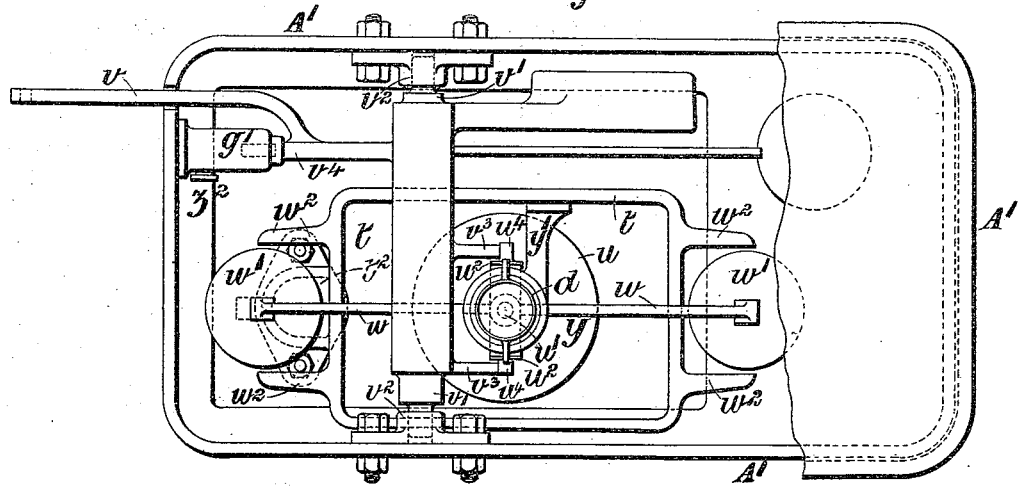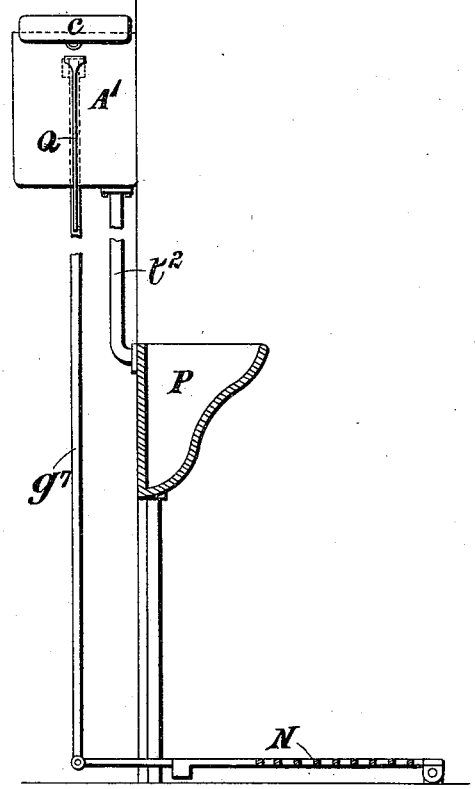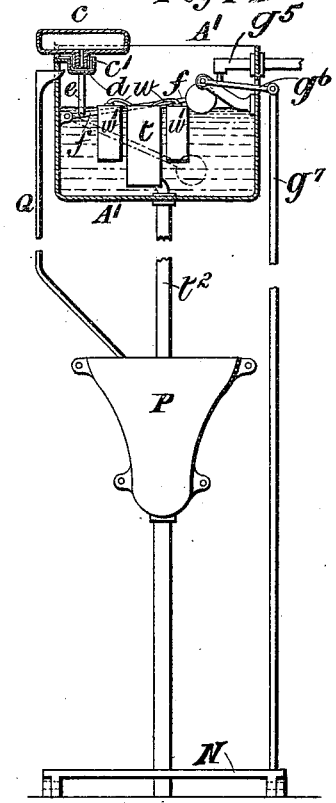

United States Patent Office.

FREDERICK BARKER HILL, OF LONDON, ENGLAND, ASSIGNOR OF ONE-HALF TO ROBERT DANIEL BRETT, OF SAME PLACE.

TREATMENT OF SEWAGE AND VENTILATION OF DRAINS.

SPECIFICATION forming part of Letters Patent No. 555,006, dated February 18, 1896.

Application filed June 1, 1892. Serial No. 435,204. (No model.) Patented in England April 26, 1890, No. 6,397.

*To all whom it may concern:*

Be it known that I, FREDERICK BARKER HILL, engineer, a subject of the Queen of Great Britain, residing at London, England, have invented new and useful Improvements Relating to the Treatment of Sewage and the Ventilation of Drains and Sewers and to Apparatus Therefor, (for which I have obtained a patent in Great Britain, No. 6,397, bearing date April 26, 1890,) of which the following is a specification, reference being had to the accompanying drawings.

My invention relates to the treatment of sewage and the ventilation of drains and sewers, and to apparatus therefor; and my said invention is chiefly designed to provide for deodorizing the sewage and disinfecting the air in or escaping from the drains or sewers in a more effectual manner than has heretofore been practiced.

An important feature of my said invention is the provision which I make for the treatment of the sewage as it flows from the houses or other buildings to the outfall, and in some instances also at the outfall. I am thus enabled to deodorize the sewage in a very effectual manner by dealing with the same in small quantities and to obviate in a great measure the formation of noxious gases in the drains or sewers without causing undue precipitation of the sewage. For this purpose I provide suitable means whereby measured quantities of the deodorizing or disinfecting fluid will be delivered into measured quantities of sewage, the said deodorizing or disinfecting fluid being discharged into the sewage simultaneously with the flow of the latter into a tank or chamber. The deodorizing of the sewage will thus be effectually accomplished and its decomposition prevented. I find it advantageous to provide for the periodical flushing of the drains or sewers and for the introduction of the deodorizing or disinfecting fluid into the flushing-tanks simultaneously with the flow of sewage or of water for flushing the sewers into the said tanks, so that the said fluid will be mixed with the sewage in predetermined proportions.

I sometimes provide for treating different kinds or classes of sewage flowing from dwelling-houses and other buildings with different kinds of chemicals, according to the nature of the sewage. In this case the chemicals must be selected so that when the different kinds of sewage treated thereby are mixed together in the main sewer they will not produce any deleterious effect.

In one form of apparatus at present in use for introducing deodorizing chemicals into drains or sewers such chemicals are allowed to drip continually into the drain or sewer without any attempt being made to provide for the automatic regulation or control of their delivery according to the amount of sewage flowing through the drain or sewer, the flow of the chemicals being controlled by hand. Consequently when no sewage is flowing through the sewers great waste of the chemicals takes place, while if an excessive or abnormal amount of sewage is flowing through the sewers the quantity of chemicals delivered into the same is insufficient for the object sought to be attained. By my invention, however, I overcome these defects and provide for the use of the chemicals in a very economical manner, while insuring the effectual action of the said chemicals upon the sewage at all times.

I sometimes provide for the introduction of suitable chemicals—such, for instance, as a mixture of manganate of soda and sulphuric acid—into the drain-pipe or sewer in automatically-regulated proportions at different places throughout the course followed by the sewage. For instance, I introduce a suitable quantity of the said chemicals first into the water-closet pan or similar receptacle, and then into the drain or sewer at one or more parts thereof, and finally at the outfall; or I introduce the chemicals at any suitable part of the drain-pipe leading from each house or other building or from each row or series of houses or other buildings without using such chemicals in the water-closet pan or similar receptacle; and, if desired, I also treat the sewage at other parts of the sewers and at the outfall.

Another feature of my said invention is the provision which I make for subjecting to the action of deodorizing or disinfecting fluid any air or gases entering or escaping from a drain, sewer, soil-pipe, or the like, through a ventilating pipe or shaft or other opening.

A further object of my said invention is to provide for working the sewers or parts of the same under a pressure of gas or air.

My said invention, moreover, comprises other improvements hereinafter set forth.

In the accompanying drawings I have shown how my said invention may be conveniently and advantageously carried into practice.

Figure 4:
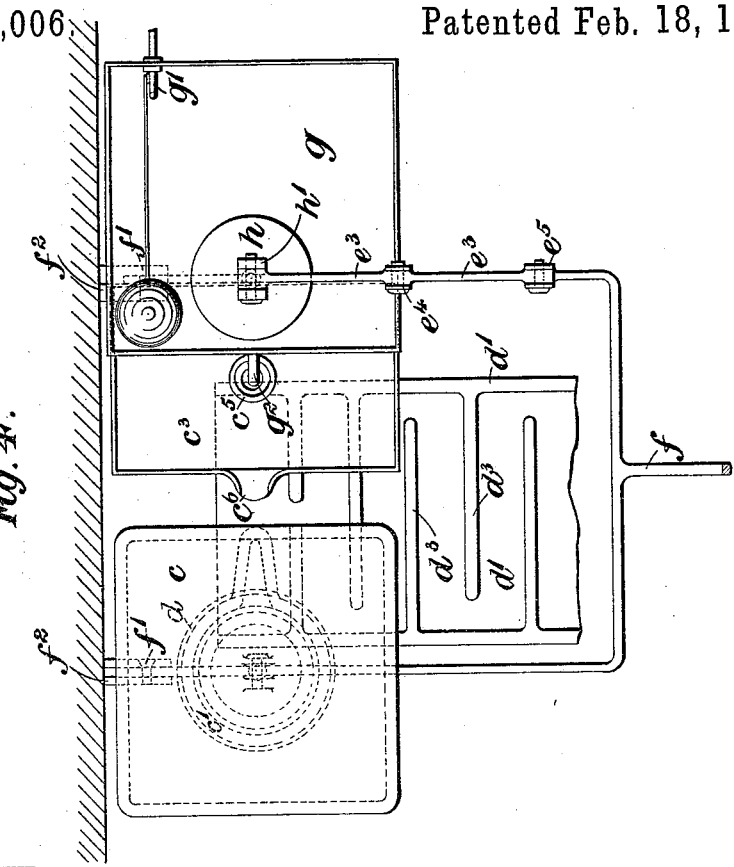
Figure 2:
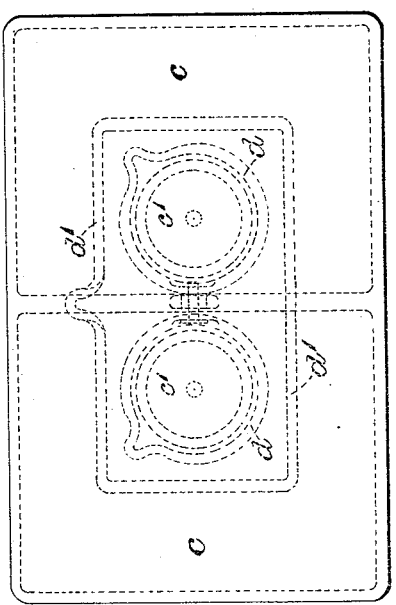
Figure 12:
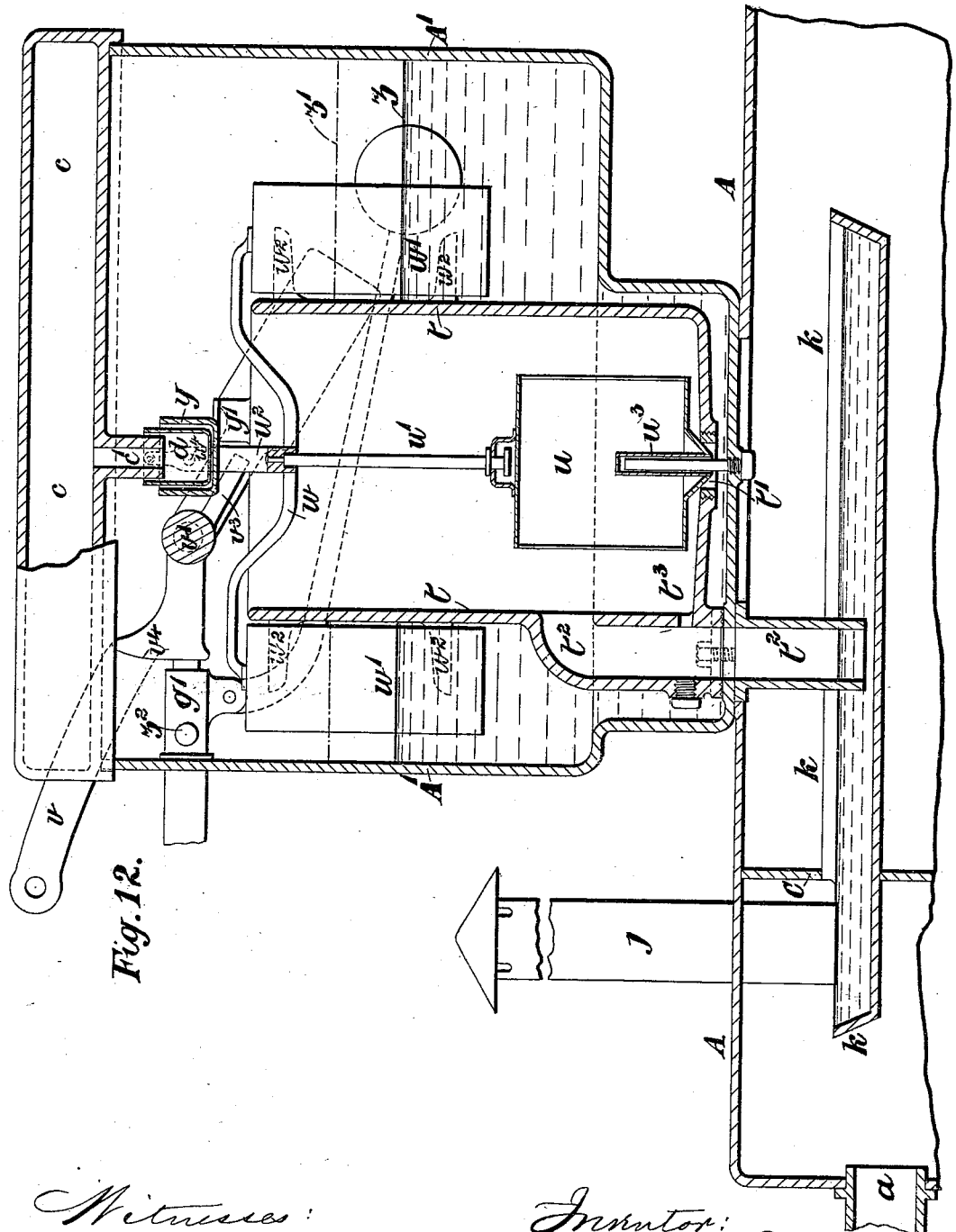

Figure 1 is a vertical section of a flushing-tank provided with one form of my apparatus for the automatic delivery or discharge of disinfecting fluid or chemicals into the sewage or water which flows into the said tank. Fig. 2 is a plan, and Fig. 3 a vertical section, showing another form or modification of my apparatus for the automatic delivery of disinfecting chemicals into the flushing-tank. Fig. 4 is a plan, Fig. 5 a vertical longitudinal section, and Fig. 6 a transverse section, showing a further modification of my said apparatus. Fig. 7 is a plan, partly in horizontal section, and Fig. 8 a vertical longitudinal section, showing a device for insuring the effectual mixing of the chemicals. Figs. 9 and 10 are vertical sections showing other modifications of my invention. Fig. 11 is an outline plan or diagram illustrating my system of treating different kinds of sewage flowing from various buildings into the main sewer. Fig. 12 is a vertical longitudinal section, and Fig. 13 a plan, showing a further modification of my improved flushing apparatus. Fig. 14 is a front elevation, partly in vertical section, and Fig. 15 a side elevation, also partly in vertical section, of a urinal combined with a flushing apparatus constructed in accordance with my invention.

Like letters indicate corresponding parts throughout the drawings.

A is the flushing-tank, which is provided with a suitable siphon and float B, preferably constructed substantially as described in the specification of former British Letters Patent granted to me and dated May 23, 1887, No. 7,473, and provided with a deep seal or trap B'. The said siphon and float may, however, be of any other suitable construction. One of these flushing-tanks is to be arranged in the drain-pipe or sewer-pipe leading from any house, shop, manufactory, or the like, or from any group of houses, shops, or manufactories, the sewage from which is to be treated by my improved system or from any group of streets from which the sewage flows through branch sewers into the main sewer, and one of the said tanks may also be used at the outfall if desired.

$a$ is the inlet-pipe, and $b$ the outlet-pipe, for the sewage.

In a convenient position within the tank A I fix a device whereby while the sewage is accumulating in the said tank A a suitable quantity of disinfecting chemicals—as, for instance, a mixture of manganate of soda and sulphuric acid—will be discharged into the same, the quantity of disinfecting chemicals thus discharged into the tank being so proportioned to the quantity of sewage flowing into the said tank that such sewage will be effectually deodorized without undue precipitation.

The apparatus shown in Fig. 1 for automatically delivering the chemicals comprises a tank or vessel $c$, which is closed at the top and which is provided with a downwardly-projecting outlet-pipe $c'$, closed at its lower end with the exception of one or more openings $c^2$. This vessel $c$ is intended to contain a supply of the disinfecting or deodorizing fluid. The said apparatus also comprises a cup or vessel $d$, open at the top and of such a size that it will pass easily over the outlet-pipe $c'$ and inclose an annular space around the said pipe. The said vessel $d$ is supported upon a rod $e$, which is fitted to slide up and down in a bracket $e'$ secured to one side of the flushing-tank, and is coupled at its lower end by a pin $e^2$, or equivalent connection, to a float-lever $f$. This float-lever is pivoted at $f'$ to a lug $f^2$ on the bracket $e'$, and is provided at its free extremity with a float $f^3$, which has sufficient buoyancy to support the vessel $d$. The tank or vessel $c$ is provided with an aperture closed by a removable plug to permit of replenishing the supply of disinfecting or deodorizing fluid when required.

The operation of the apparatus shown in Fig. 1 is as follows—that is to say: The parts are shown in the drawing in the position which they occupy when the sewage has risen to the level indicated and is about to operate the siphon, the required quantity of the disinfecting or deodorizing fluid having been mixed with the sewage in the tank A in the manner hereinafter described, and the space between the pipe $c'$ and the cup $d$ being full of such fluid. It is obvious that by reason of the orifice $c^2$ of the pipe $c'$ being closed by the liquid in the said cup the liquid cannot continue to flow from the vessel $c$, because no air can enter the latter to replace the liquid. When the flush takes place and the float-lever $f$ consequently descends, the vessel $d$ is moved downward and partially withdrawn from the pipe $c'$ until the aperture $c^2$ is opened or uncovered, so as to admit air to the vessel $c$. The liquid will then flow from the said vessel $c$ into the cup $d$ until the said aperture $c^2$ is again covered by the liquid in the said cup. As soon as this occurs the flow again ceases, the inflow of air to replace the liquid being arrested. After the flush has ceased and when the sewage again commences to accumulate in the tank A the float $f^3$ gradually rises and carries with it the cup $d$. The liquid in the said cup is displaced by the pipe $c'$ and is thereby caused to overflow into the tank A, where it mixes with the sewage and disinfects or deodorizes the same. It is obvious that, inasmuch as the lifting of the cup $d$ takes place simultaneously with and corresponds to the rise of the sewage in the tank A, the quantity of the chemical fluid discharged into the said tank must be proportional to the quantity of sewage flowing into the same. Moreover the said chemical fluid, being discharged into the tank A simultaneously with the sewage, is mixed with the sewage as soon as the latter enters the said tank. By this means I avoid the precipitation that would occur if the entire quantity of the chemical fluid required to treat the sewage contained in the tank when full were discharged into the same at once.

I prefer to provide a division-plate or partition C within the tank A, so as to form therein a small compartment into which the sewage and the chemical fluid will be discharged. An opening C' is formed at or near the lower end of the said plate C to permit the flow of the mixed sewage and chemical fluid into the main compartment of the tank, and a vertical slit $C^2$ is formed in the said division-plate to permit the up-and-down movement of the float-lever $f$.

Figure 3:
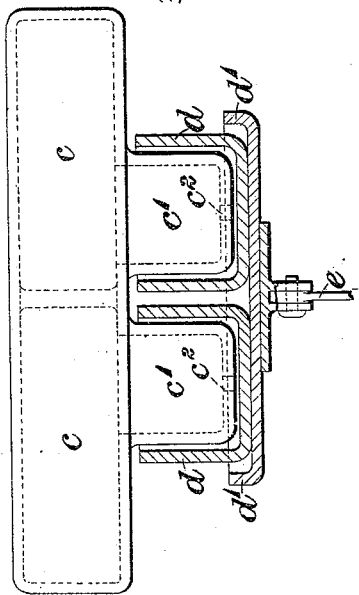

Figs. 2 and 3 show another form or modification of my apparatus for the delivery of chemicals into the flushing-tank. In this modification of my said apparatus I use two tanks or vessels $c$ for containing the supply of chemicals, such as an acid and an alkali, one tank containing, for instance, sulphuric acid and the other a solution of manganate of soda. Each of the said tanks $c$ is constructed with an outlet extension or pipe $c'$, and the said tanks $c$ operate in a similar manner to that above described, in conjunction with two cups $d$ connected to a float-lever, as in the arrangement above described. I arrange beneath the cups $d$ a shallow tray $d'$, in which the overflowing liquids from the two cups $d$ will be mixed before being discharged over the lip or edge of the said tray into the sewage in the flushing-tank. I thus provide for insuring the production of oxygen or other suitable gas in the required quantity to purify or disinfect the vitiated air in the drain or sewer and for effecting the desired treatment or partial treatment of the sewage on its way to the outfall.

It is evident that my automatic apparatus for the discharge of chemicals into the sewage may be combined with a flushing apparatus operated either by the sewage or by water allowed to flow into the apparatus for the purpose of flushing the drains or sewers.

In Figs. 4, 5, and 6 I have shown an arrangement wherein I use the alkali in a solid form. The said alkali is contained in a box or tank $c^3$ provided with a perforated false bottom $c^4$, in which is fixed an upright pipe $c^5$ communicating at its lower end with the space between the said perforated false bottom and the true bottom of the said box or tank $c^3$. The solid alkali is stored in the space above the false bottom $c^4$. Above the tank $c^3$ I fix a water-cistern $g$, provided with a ball-valve $g'$ and with an outlet-pipe $g^2$ which is arranged to discharge into the upright pipe $c^5$. While passing up from below the false bottom $c^4$ through the solid alkali in the vessel $c^3$ the water will dissolve a portion of the said alkali, and thereby form an alkaline solution, which when mixed with the acid will act as a disinfectant. The cistern $g$ is, moreover, provided with a plunger or displacer $h$, which is coupled at $h'$ to a lever $e^3$ pivoted at $e^4$ to a bracket formed or fixed on the side of the cistern $g$. The said lever $e^3$ is connected by a rod $e^5$ to the float-lever $f$. The plunger or displacer $h$ is formed with a central hole for working on a guide-rod $h^2$ attached to the bottom of the cistern $g$. The tank $c$ is filled with a chemical liquid such as sulphuric acid. The construction of this tank $c$ and the mode of discharging the contents of the same in regulated quantities are the same as in the arrangements hereinbefore described. A tray $d'$ is supported beneath the outlet $d^2$ of the vessel $d$ and beneath the outlet $c^6$ of the tank $c^3$ for the purpose of receiving the chemicals therefrom and for insuring the mixing of such chemicals before they are delivered into the sewage.

The operation of the apparatus last above described is as follows, viz: When the flushing-siphon acts and the float-lever $f$ descends, the plunger or displacer $h$ is lifted, and the water-level in the cistern $g$ consequently falls. The ball-valve $g'$ then opens and allows water to flow in to fill the cistern until the said ball-valve is closed by the rising of the water to the proper level. As the sewage again accumulates in the flushing-tank and the float-lever $f$ is thereby raised, the plunger or displacer $h$ is gradually depressed and displaces some of the water in the cistern $g$, causing it to overflow through the outlet $g^2$ into the pipe $c^5$, in which it descends into the tank $c^3$. The said tank having been previously filled with liquid and the said liquid having dissolved some of the chemical substance, a corresponding quantity of the solution is discharged from the lip $c^6$ of the tank $c^3$ and falls into the tray $d'$, in which it mixes with the acid simultaneously discharged in the manner hereinbefore explained from the lip $d^2$ of the cup $d$. The mixed chemicals then fall into the small compartment of the flushing-tank and disinfect or deodorize the sewage therein.

I find it advantageous to fix the tray $d'$ in an inclined position and to deliver the chemicals into the same at the higher end thereof; also, to provide a series of transverse division-plates or barriers $d^3$, which extend nearly across the said tray and are so arranged that the chemicals must follow a zigzag course when traversing the said tray. I thereby insure the thorough mixing of the two liquids, and also cause the mixture to be spread over a large surface, thus facilitating its action upon the sewer-gases for the purpose hereinafter specified. This construction of the said tray is more clearly shown in Figs. 7 and 8, which also show an arrangement of the delivery apparatus wherein the chemicals are contained in separate tanks and are discharged in the manner above described into the tray $d'$.

I sometimes provide for alternately drawing air into the flushing-tank and forcing the same, mixed with sewer-gas, from the said tank, and for disinfecting or deodorizing such air or gas before it escapes from the said tank. Moreover, it may be advantageous in some instances to provide for a continuous supply of the chemical fluid.

In Fig. 9 I have shown another modification of my apparatus, in which these features are embodied. The supply of deodorizing or disinfecting fluid is maintained by means of a ball-valve $g'$, which connects the cistern $g$ (which in this case serves for the delivery of the chemicals) with an external supply-tank situated at any convenient station. $j$ is a pipe or shaft for the admission of air into the tank A and for the escape from the said tank of the said air mixed with sewer-gas. This pipe has at its lower end a liquid-seal tray $k$. During the flow of the sewage into the tank A the chemical fluid is discharged from the cistern $g$ into the said seal-tray $k$, whence it overflows into the said tank A.

It is obvious that any air entering the tank through the pipe $j$ or any air or sewer-gas escaping from the tank through the said pipe $j$ must pass through a stratum of fresh disinfecting or deodorizing fluid. Therefore any air entering the tank will be purified or impregnated with oxygen, and all the air or gas from the said tank will be thoroughly disinfected and deodorized before passing out into the atmosphere.

In Fig. 10 I have shown a modification of my apparatus wherein I provide for the automatic delivery or discharge of the chemical fluid into the tank A by means of air compressed by the rising of the sewage in the said tank. In this modification the supply-cistern $g$ is closed by a cover $g^3$, having formed on or attached thereto an inverted cup or bell $l$, the closed end of which projects above the said cover. A vertical pipe $m$ is passed through the bottom of the cistern $g$ and extends nearly to the top of the inverted cup or bell $l$, a fluid-tight joint being formed around the said pipe, as at $m'$. This pipe has attached to its lower end an inverted cup or bell $n$, the mouth of which is at a slightly higher level than the lower end of the aforesaid flushing-siphon, so that the sewage in each flushing operation will fall to such an extent as to uncover the mouth of the said bell $n$. It is obvious that as the sewage rises in the flushing-tank the air in the inverted cup or bell $n$ will be compressed and forced into the space above the chemical fluid in the cup or bell $l$, and will displace from the cistern $g$ a proportionate amount of such fluid, which will overflow through the outlet $g^2$. This action will continue so long as the sewage continues to rise in the flushing-tank. When the flush takes place equilibrium is restored, and the level of the liquid inside and outside the cup $l$ becomes the same. The ball-valve $g'$ then opens and allows a corresponding quantity of chemical fluid from the constant supply to flow into the cistern $g$, thus filling the same again to the required level. The action above described is then repeated.

By my improved system I can provide for appropriately treating different kinds or classes of sewage separately before they enter the main or a branch sewer, and then, if necessary, further treating the mixed sewage in the said main or branch sewer, or at the outfall, or both in the main or branch sewer and at the outfall. I thereby secure the most satisfactory results as regards the thorough disinfection or deodorization of the sewage and of the escaping sewer-gas and the prevention of undue precipitation of the solid matter of the sewage before the same reaches the outfall-works.

In the arrangement shown in Fig. 11 the main sewer $o$ has flowing into it from one side the sewage from, say, a row or block D of dwelling-houses, and from the other side the sewage from, say, a slaughter-house E and a factory F or the like. The drain-pipes G from each of these buildings and those from the dwelling-houses discharge into separate flushing-tanks A fitted with any of the herein-described devices for automatically discharging or delivering disinfecting or deodorizing fluid into the same. The chemicals employed in these tanks are in each case selected according to the particular kind or class of sewage to be treated. Care must, however, be taken in selecting the said chemicals that they are such as will produce favorable results, or will at least not have any deleterious action when mixed together in the main sewer. By this means the sewage is partially disinfected or deodorized before entering the main sewer. I sometimes arrange a flushing apparatus A in combination with the main sewer and provide for the automatic delivery into the said tank simultaneously with the sewage of chemicals suitable for the treatment of the mixture of the different classes of sewage. The treatment of the sewage is then completed in the main sewer, or it may be completed at the outfall.

The drain-pipes from the dwelling-houses may be connected to a common flushing-tank, as shown, the drainage from all the houses being of the same character, or they may be connected with separate flushing-tanks.

It is obvious that in all of my improved devices the quantity of the chemical substances introduced into the sewage is proportionate to the flow thereof, or to the volume of the sewer-gas escaping from the sewer, or of the air entering the same.

In Figs. 12 and 13 I have shown a modification of my invention which is very advantageous in cases where the sewage to be treated is of a very offensive nature. The apparatus shown in these figures comprises a flushing apparatus designed to operate automatically to periodically discharge into the flushing-tank A a measured quantity of water mixed with a suitable proportion of deodorizing or disinfecting fluid. The said apparatus is, moreover, so constructed that it can be operated by hand should there be necessity at any time for discharging water mixed with the said fluid into the flushing-tank between the intervals when the said apparatus operates automatically.

The flushing-tank A shown in Figs. 12 and 13 has arranged above it another tank A' provided with an inner chamber $t$ which communicates with the space around and beneath it through an opening $t'$. This opening is closed by a float-valve $u$ provided with a rod $u'$, which has attached to its upper end a forked extension $u^2$ connected at its upper extremities to the cup $d$.

$t^2$ is the main outlet from the chamber $t$ and $t^3$ is a small after-flush thoroughfare.

The valve $u$ is guided in its up-and-down movement by a pin or rod $u^3$ fixed in the bottom of the tank A'.

$v$ is a lever for actuating the apparatus by hand. The said lever is formed with a spindle or fulcrum-pin $v'$ whereby it is supported in bearings $v^2$ attached to the side of the tank A'. The said lever $v$ is provided with a pair of arms $v^3$ adapted to engage with pins or studs $u^4$ projecting from the fork $u^2$, so that when a cord or chain attached to the said lever $v$ is pulled downward the arms $v^3$ will act through the pins or studs $u^4$ to raise the float-valve $u$ and thus permit the flow of water through the hole $t'$ into the inner chamber $t$, whence it will flow through the passages $t^2$ $t^3$.

The lever $v$ is constructed with a curved surface or cam $v^4$, which, when the said lever $v$ is moved as above described, will act upon the ball-tap $g'$ and close or prevent the opening of the same, thereby preventing the discharge of water into the tank A' while the flush is taking place.

I provide around the cup $d$ a second cup $y$, which is slightly larger than the said cup $d$, and which is formed on or attached to a bracket $y'$ secured to the inner chamber $t$.

In the tank A a tray $k$ is so arranged beneath the outlet $t^2$ that the water flowing from the latter will be discharged into the said tray and will overflow therefrom into the sewage in the tank A.

When the float-valve $u$ is opened, as above described, the cup $d$ is raised, thus causing the chemical fluid contained therein to overflow into the stationary cup $y$. The float-valve $u$ and cup $d$ are then upheld by reason of the buoyancy of the said float-valve. When the lever $v$ is released and the level of the water in the chamber $t$ has descended to the lower edge of the aperture of the passage $t^2$, the valve $u$ and cup $d$ slowly descend, the water meanwhile flowing through the after-flush aperture $t^3$, and the said cup $d$ at the same time gradually displaces the chemical fluid in the cup $y$ and causes the same to overflow into the water in the chamber $t$, in which it is mixed with the water and whence it flows therewith through the aperture $t^3$ into the tray $k$. A suitable quantity of the chemical fluid is thus discharged with the after-flush into the tray $k$ and enters the latter near the bottom thereof. At the termination of every after-flush, therefore, there is a fresh supply of the chemical fluid around the lower end of the outlet-pipe $t^2$. Moreover, the chemical fluid discharged with each after-flush into the tray $k$ will be carried over by the next main flush into the sewage in the tank A.

From the foregoing description it is evident that a small stream of water cannot be allowed to flow continuously through the tank A', even should the lever $v$ be moved sufficiently to just open the valve $u$ and be held in that position, as the valve $g'$ is kept closed by the cam $v^4$ as long as the lever is so held.

The buoyancy of the valve $u$ may be varied to suit different requirements and the said valve may be arranged to close when the depth of water in the chamber $t$ has fallen to any desired level below that of the mouth of the outlet $t^2$.

In addition to providing for the operation of the flushing apparatus by hand I combine with the said apparatus an automatic device whereby it will be periodically operated, and which is independent of the hand flushing-lever $v$. For this purpose I fix on the valve-rod $u'$ a cross-bar $w$, to the ends of which are attached a pair of floats $w'$. These floats are suspended within the outer water-space of the tank A' and are preferably guided by arms or lugs $w^2$ projecting from the inner chamber $t$, or by other suitable means. The said floats $w'$ are so constructed that when the water has risen to a predetermined level, as indicated for example at $z'$, the buoyancy of the said floats will be sufficient to lift the valve $u$ and thereby operate the flushing apparatus.

$z$ indicates the water-level in the tank A' when the ball-tap $g'$ is closed by the rising of the water in the said tank; and $z'$ indicates the water-level at which the buoyancy of the floats $w'$ becomes sufficient to lift the valve $u$.

To permit the raising of the water-level from $z$ to $z'$ after the ball-tap is closed, I provide a small opening in the casing of the said ball-tap through which the water is allowed to continuously flow. This opening is provided with a screw $z^2$ or other convenient device for regulating the flow of the water through the same. It is obvious that after the ball-tap is closed the water continuing to enter the tank A' through the said subsidiary opening will slowly rise in the said tank, and after an interval of time, which may be varied as desired by suitably adjusting the screw $z^2$, the water-level will be raised to $z'$ and the floats $w'$ caused to lift the float-valve $u$ and automatically effect the operation of the flushing apparatus.

It is evident that the discharge of disinfecting fluid into the after-flush will take place both when the flush is effected by the automatic device and when it is effected by hand. Moreover, when the flush is effected by hand it is delivered with equal efficiency whether the lever $v$ is held down for a long or a short period.

The tank A is, if desired, provided with a device operated by a float-lever, as hereinbefore described, for the automatic delivery of deodorizing or disinfecting fluid into the sewage flowing into the said tank. In this case, in addition to this supply of the said fluid, a quantity of such fluid mixed with water will be periodically delivered from the tank A' into the tank A. Moreover, should it be found necessary, the flushing-tank A' can be operated by hand as often as may be required in order to increase the proportion of the chemical fluid delivered into the sewage.

It is evident that, if desired, the tank A may be provided with a ventilating-shaft $j$ so arranged that its lower end will be sealed by the liquid in the tray $k$.

When the treatment of sewage according to my improved system is to be commenced in the water-closet, urinal or the like, I find it advantageous to construct my apparatus as hereinafter described. For instance, I employ a flushing-tank which will operate automatically and may also be operated by hand, and which is constructed to give an after-flush and to deliver with the said after-flush a suitable quantity of the disinfecting or deodorizing chemicals. By this means I provide for filling the pan of the water-closet or the like after each flush with a strong chemical solution, which remains in the pan until the next flush takes place, and which acts to deodorize or disinfect any gas that may escape through the seal of the said closet.

I prefer to so construct the said flushing-tank that it will operate automatically at intervals which may be long or short as desired, and thereby renew the chemical solution in the closet-pan periodically, irrespectively of the operation of the flushing-tank by hand.

The apparatus shown in Figs. 12 and 13 is very advantageous for this purpose, the outlet $t^2$ being connected with a pipe through which the liquid will flow into the water-closet pan or similar receptacle.

In applying my improvements to a urinal I provide the same with a flushing-tank somewhat similar to that shown in Figs. 12 and 13, but so constructed that the discharge of disinfecting fluid into the pan or receptacle will take place while the said pan or receptacle is being used—that is to say, the flow of water into the flushing-tank will be controlled by the weight of a person standing on a foot-plate while using the urinal, or in any other convenient manner, so that during the use of the urinal water will be allowed to flow into the flushing-tank, and the rising of the water in the flushing-tank will effect the discharge of the disinfecting fluids, as above described.

In the apparatus shown in Figs. 14 and 15 the flushing-tank A' is supplied with water through a cock or valve $g^5$ controlled by a spring and by the weight of a person standing on the foot-plate N, with which the said cock or valve is connected by a lever $g^6$ and rod $g^7$. The depression of the said foot-plate N causes the opening of the cock or valve $g^5$, thus permitting the flow of water into the tank A'. The rising of the water in the said tank, by lifting the float-lever $f$, effects the discharge of disinfecting fluid from the cup $d$ into a pipe Q, through which it flows into the pan or receptacle P. When the foot-plate is released the cock or valve $g^5$ is closed by its spring, and the water ceasing to rise in the tank A' the discharge of the disinfecting fluid is arrested. When the tank A' is nearly filled the flush takes place automatically, as above described, and the lever $f$ and cup $d$ descend, thus permitting the refilling of the said cup with disinfecting fluid from the vessel $c$.

I have hereinabove described various forms of apparatus for automatically treating sewage with disinfecting or deodorizing chemicals, the said treatment being conducted at various points in the course of the sewage as it passes to the outfall—as, for instance, in the water-closet, urinal or the like, in the drain-pipes and in the main sewer, and also, if desired, at the outfall. I may use any suitable form of my apparatus at any of the points where the treatment of the sewage is to be effected. Moreover it is obvious that I can somewhat further modify the construction of my said apparatus without departing from the nature of my said invention.

My said invention is applicable with advantage for the treatment of sewage from a single house without interfering with the connection of adjacent houses with an existing system of sewerage, and, if desired, without connecting it with any system of sewerage, the sewage being treated as above described and collected in a suitable tank, cess-pool or the like, and precipitated by any suitable chemicals, so that it can be used as manure, and the liquid being allowed to flow into a river or stream.

What I claim is—

1. The combination, with a drain or sewer and with a flushing-tank discharging into the same, of an automatic delivery apparatus comprising a receptacle for a disinfecting or deodorizing substance, and a displacing device the operation of which is governed by the rise and fall of the liquid in said tank and whereby the disinfecting or deodorizing substance is displaced from said receptacle and caused to overflow into said liquid, substantially as hereinbefore described.

2. The combination, with a flushing-tank, of a receptacle for a disinfecting or deodorizing substance, and a displacing device consisting of an inverted air-holder or bell in said receptacle, an inverted air-holder or bell in said tank, and a pipe connecting the upper ends of said holders or bells, substantially as hereinbefore described and for the purposes specified.

3. The combination, with a drain or sewer and with an automatic delivery apparatus whereby a disinfecting or deodorizing substance is discharged into the sewage flowing through the same, of a vessel or tray into which the said substance is delivered, and a ventilating-shaft the lower end of which dips into the said vessel or tray, substantially as described.

FREDERICK BARKER HILL.

Witnesses:
   JOHN T. KNOWLES,
   DAVID YOUNG.